(12) United States Patent
Schuster

(10) Patent No.: US 9,146,383 B2
(45) Date of Patent: Sep. 29, 2015

(54) SUPER WIDE ANGLE LENS ARRANGEMENT FOR INFRARED APPLICATIONS

(75) Inventor: Norbert Schuster, Olen (BE)

(73) Assignee: Umicore, Brussels (BE)

( * ) Notice: Subject to any disclaimer, the term of this patent is extended or adjusted under 35 U.S.C. 154(b) by 163 days.

(21) Appl. No.: 13/988,607

(22) PCT Filed: Nov. 22, 2011

(86) PCT No.: PCT/EP2011/070711
§ 371 (c)(1),
(2), (4) Date: Jun. 28, 2013

(87) PCT Pub. No.: WO2012/069491
PCT Pub. Date: May 31, 2012

(65) Prior Publication Data
US 2013/0271852 A1 Oct. 17, 2013

Related U.S. Application Data

(60) Provisional application No. 61/345,000, filed on Dec. 6, 2010.

(30) Foreign Application Priority Data

Nov. 23, 2010 (EP) .................................... 10192149

(51) Int. Cl.
*G02B 13/14* (2006.01)
*G02B 9/06* (2006.01)
(Continued)

(52) U.S. Cl.
CPC ...... *G02B 13/14* (2013.01); *G02B 9/06* (2013.01); *G02B 13/003* (2013.01); *G02B 13/008* (2013.01); *G02B 13/06* (2013.01)

(58) Field of Classification Search
CPC ...... G02B 9/06; G02B 13/003; G02B 13/008; G02B 13/06; G02B 13/14; G02B 9/12–9/64

USPC .............. 359/753, 796, 355–357, 713–717, 359/745–748, 754–757, 759, 760, 763, 764, 359/767–769, 771, 772, 779, 780, 791–794
See application file for complete search history.

(56) References Cited

U.S. PATENT DOCUMENTS

| 4,738,496 A | 4/1988 | Canzek |
| 6,236,515 B1 | 5/2001 | Yamamoto et al. |

(Continued)

FOREIGN PATENT DOCUMENTS

| JP | 2006-119331 | 5/2006 |
| JP | 2011-237545 | 11/2011 |

OTHER PUBLICATIONS

Izumi, Tatsuya, et al. "Development of Occupant Detection System Using Far-Infrared Ray (FIR) Camera", Sei Technical Review, No. 69, Oct. 2009, pp. 72-77.
(Continued)

*Primary Examiner* — Ricky Mack
*Assistant Examiner* — Gary O'Neill
(74) *Attorney, Agent, or Firm* — Brinks Gilson & Lione

(57) ABSTRACT

More particularly, a wide-angle optical assembly for an IR camera is described, comprising a lens system consisting of an object-side lens (2) and an image-side lens (3), and an aperture stop (1) on the object-side of the assembly, wherein: the object-side lens (2) and the image-side lens (3) are positive meniscus lenses; all centers of vertex radii of the lens surfaces are oriented towards the object-side, defining for each lens a concave surface and a convex surface; the thickness (8) of the object-side lens (2) is larger than 0.60 EFL; the thickness (9) of the image-side lens (3) is between 0.30 EFL and 0.70 EFL; 0.95<BFL/EFL<1.2; and, the EFL amounts to between 55% and 75% of the image plane diagonal.

6 Claims, 1 Drawing Sheet

(51) Int. Cl.
*G02B 13/00* (2006.01)
*G02B 13/06* (2006.01)

(56) References Cited

U.S. PATENT DOCUMENTS

| | | |
|---|---|---|
| 2004/0160680 A1* | 8/2004 | Shinohara .................... 359/717 |
| 2005/0254147 A1 | 11/2005 | Wang et al. |
| 2006/0056072 A1* | 3/2006 | Zeng et al. .................... 359/794 |
| 2006/0250706 A1 | 11/2006 | Liao |
| 2008/0030875 A1 | 2/2008 | Nishizawa |

OTHER PUBLICATIONS

Curatu, George et al., "Using Molded Chalcogenide Glass Technology to Reduce Cost in a Compact Wide-Angle Thermal Imaging Lens", Proc. SPIE 6206, Infrared Technology and Applications XXXII, 62062M (May 18, 2006).

Cox, Arthur, "A System of Optical Design", Focal Press (1964): 651-655 and 658-659.

International Search Report, issued in PCT/EP2011/070711, dated Feb. 21, 2012.

\* cited by examiner

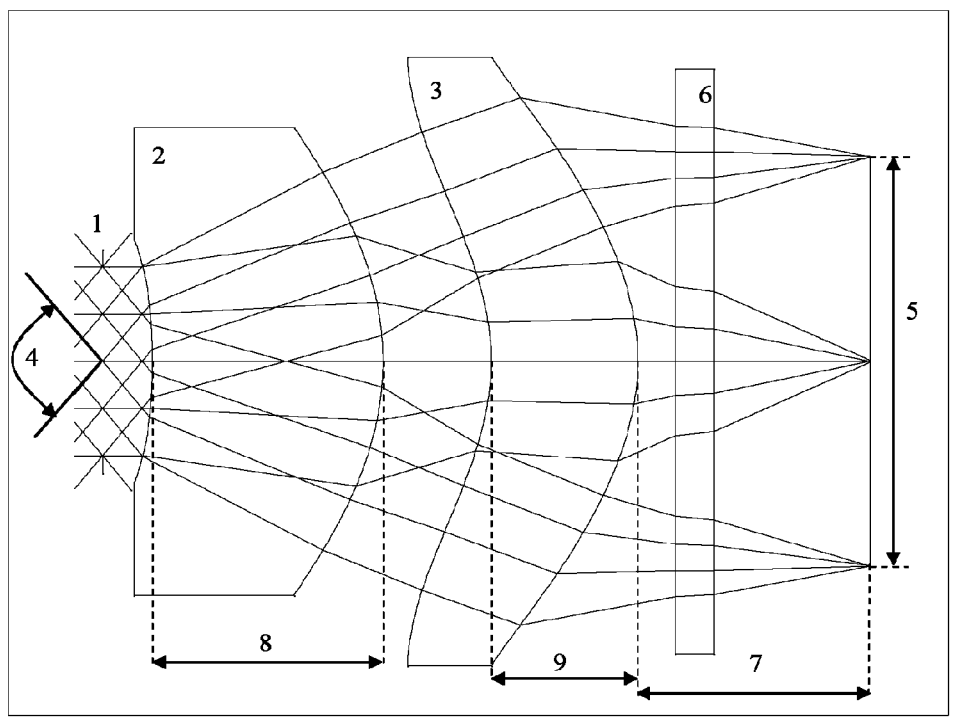

SUPER WIDE ANGLE LENS ARRANGEMENT FOR INFRARED APPLICATIONS

This application is a National Stage application of International Application No. PCT/EP2011/070711, filed Nov. 22, 2011, which claims the benefit of U.S. Provisional Application No. 61/345,000, filed Dec. 6, 2010. This application also claims priority under 35 U.S.C. §119 to European Patent Application No. 10192149.2, filed Nov. 23, 2010.

The invention relates to high resolution, super wide angle optical assemblies for IR (infrared) imaging.

Recently, IR detector manufacturers have launched large-format, uncooled and affordable high resolution IR detectors. A pixel pitch of 17 μm is typically achieved. The full exploitation of these detectors requires optical assemblies offering a higher spatial resolution than before. This allows for IR cameras delivering sharp and high-contrast images in a surprisingly large field of view.

Up to now, only systems with four or more lenses are known to provide both a high resolution image and a super wide angle of view, i.e. a diagonal field of view larger than 90 degrees. While this high number of lenses yields good optical properties, such systems are relatively expensive. Due to the decreasing costs of high resolution detectors, and to the stringent quality of the optics needed to fully exploit them, the proportion of costs related to optical assemblies is sharply increasing.

In known super wide angle assemblies, several lenses are arranged on both sides of the aperture stop. A classical long back focal length or retro-focus arrangement has a divergent front group in front of the stop, and convergent groups behind the stop (A. Cox. "A system of Optical Design.", Focal Press (1964): 651-655). A classical arrangement for a short back focal length defines more than five lenses around the aperture stop (A. Cox. "A system of Optical Design.", Focal Press (1964): 658-659).

In U.S. Pat. No. 4,738,496, a high aperture lens arrangement having a maximal field of view of 60 degree is realized with four lenses.

One example of IR wide angle lens with a front-side stop has been described (SEI Technical Review, Num. 69, October 2009: 72-77). A field angle of only 64 degrees is achieved using three ZnS lenses.

An IR wide angle system using only two lenses is known (Curatu et al. SPIE Proc. Vol. 6206 (2006)). The aperture stop is placed in the front focal plane of the lens assembly, which generates an image side telecentric ray path. The field of view is however limited to 62 degrees.

US 2006/0250706 shows a wide angle 2-lens assembly for use in compact digital devices. The system comprises a positive lens and a negative lens. It is not particularly suitable for IR applications and does not offer a wide angle of view.

U.S. Pat. No. 6,236,515 describes a large number of lens topologies for use in compact optical zoom units. Some 2-lens systems are illustrated, but these are taught to be suitable in telephoto-oriented zooms; they are therefore not adapted for wide angles. The image-side lens is moreover always negative.

JP 2006-119331 shows a wide field of view 2-lens system with frontal diagrphragm for use in electronic cameras. The system is however not particularly suitable for IR applications as some of its lenses are made from plastic. It has moreover an object-side lens having a convex face on the object side.

JP 11-237545 concerns a high performance wide angle assembly equipped with 3 lens groups.

In many IR applications, it is preferred to have the aperture stop on the front side (object side) of the lens assembly. Indeed, when the lens assembly is to be built directly into the camera body, it is necessary, for economic reasons and/or structural design requirements of the camera body, to have the diaphragm, shutter and other mechanisms mounted in front. Moreover, having a front side stop offers some degree of mechanical protection of the exposed lens against impact or dirt, in particular when the camera is mounted on vehicles.

It is therefore an object of this invention to provide a front aperture lens arrangement with only two lenses, so as to reduce costs, yet achieving a large field of view combined with a resolution adapted to state-of-the-art IR detectors.

A first embodiment concerns a wide-angle optical assembly for an IR camera, comprising a lens system consisting of an object-side lens (2) and an image-side lens (3), and an aperture stop (1) on the object-side of the assembly, wherein: the object-side lens (2) and the image-side lens (3) are positive meniscus lenses; all centers of vertex radii of the lens surfaces are oriented towards the object-side, defining for each lens a concave surface and a convex surface; the thickness (8) of the object-side lens (2) is larger than 0.60 EFL; the thickness (9) of the image-side lens (3) is between 0.30 EFL and 0.70 EFL; 0.95<BFL/EFL<1.2; and, the EFL amounts to between 55% and 75% of the image plane diagonal.

In a further embodiment, the optical assembly has in addition one or more aspherical lens surfaces. In this case, the curvature of the concave surface of the object-side lens (2) increases with the lens height; the curvature of the convex surface of the object-side lens (2) decreases with the lens height; the curvature of the concave surface of the image-side lens (3) decreases with the lens height; and, the curvature of the convex surface of the image-side lens (3) decreases with the lens height.

In a further embodiment, at least one lens is provided with a diffractive structure. An IR-transparent material having a refraction index of more than 2.1 is preferred.

In a final embodiment, the above optical assembly may contain one or more optically flat and IR-transparent window(s) (6) for the protection of the lenses or detector.

With such a lens arrangement, a wide angle of view can be obtained using only two lenses. An F-number of 1.4 or less can be achieved, together with the spatial resolution needed to fully exploit modern detectors. In particular, an MTF higher than 40% in the centre, and higher than 33% in the corners can be achieved at 30 cy/mm for a 22 mm detector; and an MTF higher than 50% in the centre, and higher than 45% in the corners for a 7 mm detector. Furthermore, a relative illumination in the corners of more than 50% is obtained.

FIG. 1 illustrates a typical embodiment according to the invention. This super wide angle assembly is provided with the aperture stop (1) in front, a first positive meniscus lens (2) with a thickness (8), and a second positive meniscus lens (3) with a thickness (9). This lens arrangement focuses objects inside the field angle (4) on the detector plane (5) through a flat detector window (6). The field angle (4) is 100 degree, while the detector has a diagonal (5) of 7 mm. The resulting BFL (back focal length) (7) has about the same value as the EFL (effective focal length) of the complete optical arrangement.

Table 1 shows detailed design parameters for 5 embodiments according to the invention. Apart from variations of the geometry, examples using different detector sizes and different wavebands and different lens materials are provided. The resulting image quality is reported in terms of relative illumination of the corners and in terms of MTF at 30 cy/mm, which is the relevant Nyquist frequency for 17 μm pitched detectors.

Lens materials are: GASIR®1 ($Ge_{22}As_{20}Se_{58}$), which has a refractive index of about 2.5; and germanium, which has a refractive index of about 4. Different materials such as other chalcogenide glasses or silicon would be suitable too.

The geometric parameters in Table 1 correspond to lens surfaces according to the formula:

$$z(r) = \frac{cr^2}{1 + \sqrt{1 - (1+k)c^2 r^2}} + \alpha_4 r^4 + \alpha_6 r^6 + \alpha_8 r^8 + \alpha_{10} r^{10}$$

where $c=1/r_0$ with $r_0$ the vertex radius, r the distance from optical axis, and z the coordinate on the optical axis, $r_0$, r and z being expressed in mm.

The diffractive structures are presented by phase deformation in first diffractive order according to the formula:

$$\Phi = \sum_{i=}^{N} A_i \rho^{2i}$$

where $\rho = r/r_1$ with $r_1$ the normalization radius and $A_i$ the phase coefficients. The reference wavelength is the middle of the waveband.

TABLE 1

| | | Ex. 1 | Ex. 2 | Ex. 3 | Ex. 4 | Ex. 5 |
|---|---|---|---|---|---|---|
| | | First order parameters and image quality values for 5 designs | | | | |
| First order parameters | Waveband (μm) | 8-12 | 8-12 | 3-5 | 8-12 | 8-12 |
| | Detector diagonal (mm) | 7 | 14 | 14 | 14 | 21.8 |
| | EFL (mm) | 4.0 | 9.2 | 8.6 | 7.9 | 13.3 |
| | BFL (mm) | 4.0 | 9.1 | 9.5 | 8.6 | 13.0 |
| | F-Number | 1.2 | 1.2 | 1.3 | 1.2 | 1.2 |
| | Field angle (deg) | 100 | 91 | 98 | 105 | 98 |
| Image quality values | Corner illumination (%) | 67 | 78 | 76 | 69 | 74 |
| | MTF at 30 cy/mm on axis (%) | 52 | 48 | 57 | 49 | 46 |
| | MTF at 30 cy/mm in the corner (%) | 49 | 38 | 41 | 32 | 34 |
| | | Detailed design parameters for lenses 1 and 2 | | | | |
| Stop distance (mm) | | 0.8 | 1.6 | 1.5 | 1.6 | 2.4 |
| Lens 1 | Material | Gasir ®1 | Gasir ®1 | Gasir ®1 | Gasir ®1 | Gasir ®1 |
| | Focal length (mm) | 4.33 | 8.76 | 7.59 | 9.67 | 14.1 |
| | Thickness (mm) | 3.9 | 7.6 | 7.0 | 7.0 | 10.7 |
| Surface N° 1 | | | | | | |
| | $r_0$ | −10.00 | −17.42 | −19.22 | −23.91 | −24.24 |
| | k | 0 | 0 | 0 | 0 | 0 |
| | $\alpha_4$ | −3.50E−03 | −6.70E−04 | −8.77E−04 | −4.20E−04 | −1.87E−04 |
| | $\alpha_6$ | −5.40E−05 | −2.67E−06 | 5.54E−06 | −9.33E−06 | −1.32E−06 |
| | $\alpha_8$ | −5.80E−05 | −2.44E−07 | −8.92E−07 | −6.22E−07 | 1.56E−08 |
| | $\alpha_{10}$ | 0.00E+00 | 0.00E+00 | 0.00E+00 | 0.00E+00 | −4.61E−10 |
| Surface N° 2 | | | | | | |
| | $r_0$ | −4.926 | −9.529 | −8.803 | −10.63 | −14.42 |
| | k | −1.26 | −0.560 | −0.744 | 0 | −0.149 |
| | $\alpha_4$ | 0.00E+00 | 0.00E+00 | 0.00E+00 | 3.21E−04 | 1.29E−05 |
| | $\alpha_6$ | 0.00E+00 | 0.00E+00 | 0.00E+00 | −3.05E−06 | 0.00E+00 |
| | $\alpha_8$ | 6.53E−07 | 2.08E−04 | 3.57E−09 | 1.30E−08 | 1.06E−09 |
| | $\alpha_{10}$ | 0.00E+00 | 0.00E+00 | 0.00E+00 | 0.00E+00 | 0.00E+00 |
| Air gap (mm) | | 1.8 | 3.3 | 2.2 | 2.0 | 5.8 |
| Lens 2 | Material | Gasir ®1 | Gasir ®1 | Gasir ®1 | Ge | Gasir ®1 |
| | Focal length (mm) | 8.05 | 33.5 | 44.7 | 17.3 | 38.8 |
| | Thickness (mm) | 2.5 | 4.3 | 4.0 | 2.8 | 5.0 |
| Surface N° 3 | | | | | | |
| | $r_0$ | −4.151 | −8.831 | −7.436 | −7.570 | −12.37 |
| | k | −3.48 | −2.91 | −2.42 | −3.47 | −2.06 |
| | $\alpha_4$ | 0.00E+00 | 0.00E+00 | 0.00E+00 | 1.45E−04 | 0.00E+00 |
| | $\alpha_6$ | 5.31E−05 | 2.50E−06 | 3.79E−06 | −5.73E−07 | 3.58E−07 |
| | $\alpha_8$ | −8.38E−07 | −1.38E−08 | −2.70E−08 | 2.27E−09 | −8.31E−10 |
| | $\alpha_{10}$ | 0.00E+00 | 0.00E+00 | 0.00E+00 | 0.00E+00 | 0.00E+00 |
| Surface N° 4 | | | | | | |
| | $r_0$ | −4.232 | −9.815 | −8.914 | −8.477 | −12.80 |
| | k | −0.568 | −2.91 | −0.406 | −1.62 | −0.513 |
| | $\alpha_4$ | 2.18E−03 | 1.87E−04 | 1.99E−04 | 1.36E−04 | 5.08E−05 |
| | $\alpha_6$ | −3.98E−05 | −4.01E−08 | 2.46E−08 | −7.52E−07 | 3.33E−08 |
| | $\alpha_8$ | 1.22E−06 | 5.67E−09 | 5.78E−09 | 3.61E−05 | 3.07E−10 |
| | $\alpha_{10}$ | 0.00E+00 | 0.00E+00 | 0.00E+00 | 0.00E+00 | 0.00E+00 |
| N° of diffractive surface | | 3 | 3 | 3 | 2 | 3 |
| | $r_1$ | 0.475 | 1.08 | 1.00 | 1.00 | 1.00 |
| | $A_1$ | −4.89E−01 | −1.21E+00 | −1.49E+00 | −6.52E−01 | −6.73E−01 |
| | $A_2$ | 1.39E−03 | 5.89E−03 | 1.10E−02 | 3.36E−03 | 1.10E−03 |
| | $A_3$ | 0.00E+00 | 0.00E+00 | −6.13E−05 | 0.00E+00 | 0.00E+00 |

The illustrated arrangements all achieve an angle of view of more than 90 degrees using only two lenses, while ensuring a resolution of better than 30% MTF at 30 cy/mm, a value compatible with the exploitation of modern 17 μm detectors. A corner illumination of better than 65% is achieved, this result being considered as more than adequate.

According to these examples, one of the lens surfaces is provided with a diffractive pattern, mainly to cope with chromatic aberrations. To this end, an internal surface of the lens assembly is preferably selected. In some specific cases, such as when lens materials with very low dispersion are used, the lens design could abstain from a diffractive pattern.

Other surface shapes than those illustrated in Table 1 can of course also yield successful results if the above-defined key parameters are respected. Starting from the given key parameters, other successful designs can be obtained by optimization without undue effort using state-of-the-art optical design software such as Zemax, Code V, HEXAGON, or OSLO.

To this end, the classical damped least square (DLS) method of optimization is recommended to minimize a merit function. It is thereby recommended to include wave front errors as well as principal ray aberrations like astigmatism and distortion in the merit function.

The invention claimed is:

1. A wide-angle optical assembly for an IR camera, comprising a lens system comprising an object-side lens, an image-side lens, and an aperture stop on an object-side of the assembly, wherein:
   the object-side lens and the image-side lens are positive meniscus lenses;
   all centers of vertex radii of the surfaces of the lenses are oriented towards the object-side, defining for each lens a concave surface and a convex surface;
   a thickness of the object-side lens is larger than 0.60 EFL;
   a thickness of the image-side lens is between 0.30 EFL and 0.70 EFL;
   0.95<BFL/EFL<1.2; and,
   the EFL is between 55% and 75% of the image plane diagonal; and where EFL is the effective focal length of the optical assembly and BFL is the back focal length of the optical assembly.

2. The optical assembly of claim 1, wherein one or more surfaces of the lenses are aspherical.

3. The optical system of claim 2, wherein:
   a curvature of the concave surface of the object-side lens increases with the lens height;
   a curvature of the convex surface of the object-side lens decreases with the lens height;
   a curvature of the concave surface of the image-side lens decreases with the lens height; and,
   a curvature of the convex surface of the image-side lens decreases with the lens height.

4. The optical assembly of claim 1, wherein at least one lens is provided with a diffractive structure.

5. The optical assembly of claim 1, wherein the lenses comprise IR transparent material with a refraction index of more than 2.1.

6. The optical assembly of claim 1, further comprising one or more optically flat and IR-transparent window(s) for protection of the assembly.

\* \* \* \* \*